Patented Aug. 17, 1943

2,327,132

UNITED STATES PATENT OFFICE 2,327,132

RESINOUS MATERIAL

Jacob M. Schantz, Wilmington, Del., assignor to Hercules Powder Company, Wilmington, Del., a corporation of Delaware No Drawing. Application February 8, 1941, Serial No. 378,055

10 Claims. (Cl. 260—109)

This invention relates to hydrogenated resins and more specifically to a process for the improvement of hydrogenated resins and the improved products formed thereby. It still more particularly relates to a process for the improvement of hydrogenated rosin and the improved product formed thereby.

Natural resins, and in particular, rosin, when subjected to hydrogenation, have given highly desirable products. Of first importance is their ability to resist oxidation. They are, furthermore, pale in color and generally stable to both heat and sunlight. Since these materials are widely compatible and soluble, they may be incorporated in many important commercial products. For example, they may be used in chewing gum, adhesives, metallic resinates, brewers' pitches, etc. However, it has been found that even though these hydrogenated resins give highly desirable properties to the finished product, they are responsible for certain other objectionable characteristics. One of the most usually encountered objections is the tendency of the hydrogenated resin to crystallize when used in certain compositions and when used alone as a coating material. This crystallization is quite disadvantageous in that in certain cases it destroys the tack and uniformity of the composition, and it makes the composition much more brittle. Another difficulty encountered is the tendency of the hydrogenated resin to impart taste or odor to the materials with which it comes in contact. This last characteristic is a highly undesirable one in certain potential applications of the material. Thus, for example, this characteristic detracts considerably from the desirability of using hydrogenated natural resins in brewers' pitch, chewing gum, etc.

It is an object of this invention to produce a hydrogenated resinous material which will be highly resistant to oxidation and which will not crystallize substantially either when used alone or in a composition in conjunction with other materials.

Another object of this invention is to produce a hydrogenated resinous material which will be capable of retaining its original elasticity over long periods of time.

A still further object is to produce a hydrogenated resinous material which is substantially free of odor and taste imparting substances.

Other objects will appear hereinafter.

The objects of this invention are in general accomplished by subjecting a natural resin, which has been hydrogenated to the extent that the unsaturated resin acids contained therein have been either partially or completely saturated, to the further processes of heat-treatment and removal of the light oils, volatile resin decomposition products, etc. I have found that such a treated hydrogenated resinous material, such as, for example, treated hydrogenated rosin, shows highly improved properties over the untreated material. The product is substantially resistant to oxidation; it does not crystallize when used alone or in conjunction with other substances. Furthermore, it is substantially non-brittle, odorless and tasteless.

My research has shown that when an unsaturated natural resin is hydrogenated by any of the known methods, a product is obtained which is pale in color, stable to sunlight, stable to heat and resistant to oxidation. The extent to which such a material will possess the aforementioned properties will depend to some degree upon the extent to which the double bonds of the unsaturated resin acids have been removed by treatment with hydrogen. For the purposes of this invention, it has been found that a resin, wherein from about 25% to about 100% of the double bonds have been removed by this reaction, possesses substantially different properties from those of an unhydrogenated resin and may be advantageously used in place of the latter. However, it is preferred to use a resin which has been saturated to the extent of from about 50% to about 90% of the theoretical.

In carrying out the processes embodying my invention, a quantity of a hydrogenated, natural resin is subjected to a heat treatment. The operable range of temperatures for this step is from about 200° C. to about 375° C.; however, it is preferable to use a temperature within the range of from about 250° C. to about 350° C. Atmospheric pressure is preferably used; however, this operation may be carried out at pressures thereabove or below. If a reduced pressure is employed, however, during the heat treatment, it is important that the pressure used be above that at which substantial distillation of the resin will take place, although there may be some distillation of light oils and resin decomposition products during the process. The period of heat treatment may vary within the range of from about ¼ hour to about 48 hours, but preferably within the range of from about ½ to about 10 hours. The heat treatment may be carried out with the heated resin in contact with a gas which is inert to the reaction mixture, such as, for example, $CO_2$, to prevent oxidation at the elevated temperature.

An integral part of this invention is the removal of the light oils and resin decomposition products formed as a consequence of the heat treatment along with any odor and taste imparting ingredients originally present in the resin. Some of these products are removed by distillation collaterally with the heat treatment, and substantial removal can be effected in this way. However, inasmuch as there is always a certain amount of decomposition occurring during distillation, it is preferred to effect the removal of the light oils, resin decomposition products, and odor and taste imparting ingredients by sparging the material with a gas which is inert to the reaction mixture, such as, for example, carbon dioxide, nitrogen, steam, etc. The preferred temperature to be used in the sparging operation will vary within the range of from about 150° C. to about 325° C. Reduced or atmospheric pressure may be employed.

It is desirable to conduct the processes of heat treatment and removal of light oils and resin decomposition products in such a manner that up to about 25% by weight of the resinous material used is removed. However, it is preferred to operate within the range wherein from about 5% to about 15% by weight of the resinous material is removed.

According to my invention, then, a quantity of a hydrogenated resin, such as, for example, partially or completely hydrogenated rosin, is placed in a suitable non-reactive container. The resin is then heated to a temperature of, for example, about 300° C. for a period of, for example, 6 hours, in the presence of, for example, $CO_2$. The melted mass is then sparged under vacuum or at atmospheric pressure with steam or some other gas which is inert to the reaction mixture. This procedure may be altered as desired to produce a material having somewhat different physical characteristics. Long heating time with short sparging time produces a material with a low melting point and a low acid number. Long heating with long sparging under vacuum yields a product of medium melting point and a low acid number. Short heating time with medium long sparging time yields a product with a higher acid number and a higher melting point.

It should be understood that the product which results from the practice of this invention is characterized by its comprising an at least partially hydrogenated, natural resin which is substantially free from light oils and volatile resin acid decomposition products; furthermore, the product is characterized by its comprising an at least partially hydrogenated, natural resin which is substantially free of odor and taste imparting components.

Where the term "rosin" is used therein, it should be understood that it includes both wood and gum rosin in any of the grades commonly available, also the resin acids obtained from the above rosin bases, such as, for example, abietic, pimaric, sapinic, sylvic, etc., acids, or mixtures thereof.

Any of the resinous products obtained from the members of the genus of tree known as "Pinaceae" are particularly suitable as a source of the natural resin as specified herein.

It is further to be noted that although hydrogenated rosin is the preferred ingredient to be employed in the processes described herein, the invention is not to be restricted to the use of that material. Other natural resins which can be hydrogenated by any of the well-known processes may, after such treatment, be used. It is also contemplated that the hydrogenated resins may be refined prior to heat treatment, for example, by means of selective solvents; distillation under reduced pressure; adsorbents, such as fuller's earth, activated carbon, etc.

It is contemplated, in accordance with the present invention, that plasticizers may be used in conjunction with the treated hydrogenated resins disclosed above. These plasticizers may include paraffin wax, mineral oils, rosin oil, hydrogenated rosin esters of the lower aliphatic alcohols, etc.; and they may be incorporated in any desired proportion. If rosin oil is used as a plasticizer, it is well to use a rosin oil obtained from hydrogenated rosin. It should be remembered, however, that in all cases where a plasticizer is used, care should be taken that the added material be highly refined and with minimum odor and taste.

There follow specific examples showing typical methods of preparing a resinous material embodying the principles of the invention. The hydrogenated rosin employed in these examples was rosin, the unsaturation of which had been reduced by approximately 70% of the theoretical for two double bonds by combination with hydrogen in the known manner. This hydrogenated rosin had an acid number of 168, a color of 5 amber (X on the rosin color scale), a thiocyanate value of about 20, and a melting point (drop) of 79° C. It will be understood, however, that the present invention is not limited to the use of this particular hydrogenated rosin, nor, as has been hereinbefore pointed out, is the invention limited to the use of any specific hydrogenated rosin in particular. For example, I may use hydrogenated rosin having a saturation of about 60%, an acid number of 161, a melting point (drop) of 76° C. and a color of 7.0 amber (X on the rosin scale), or hydrogenated rosin having a saturation of about 60%, an acid number of 161, a melting point (drop) of 75° C., and a color of 15 amber (WW+ on the rosin scale). In general, one can employ a hydrogenated rosin which is saturated to the extent of from about 25% to 100% of the theoretical; however, the preferred range of saturation is from about 50% to about 90% of the theoretical.

*Example 1*

Two hundred and fifty parts by weight of hydrogenated rosin were heated at 340° C. to 350° C. and at atmospheric pressure in an atmosphere of $CO_2$ for 1¾ hours. The resin was allowed to cool to 250° C., 15 inches of vacuum was applied, the resin was sparged with steam for 12 minutes, and the vacuum maintained for another 15 minutes to remove traces of moisture. The resin, when cooled to 120° C., was poured into a container. The product had a melting point of 58° C. and an acid number of 130. Further characteristics of the product are given hereinafter.

*Example 2*

Three hundred parts by weight of hydrogenated rosin were heated at 350° C. to 360° C. and at atmospheric pressure for 2 hours. The resin was allowed to cool to 250° C. and 20 inches of vacuum applied. The resin was sparged with steam for 12 minutes, and the vacuum maintained for an additional 20 minutes to remove traces of moisture. 57 parts by weight of a light colored viscous oil was obtained as the distillate. There remained 201 parts by weight of product which had a melting point of 52.5° C. and an acid number of 111.5. Further characteristics of the material are given hereinafter.

*Example 3*

Three hundred parts by weight of hydrogenated rosin were heated to 250° C. at atmospheric pressure. Then the resin was sparged with $CO_2$ while the temperature was raised to 300° C. over a period of 10 minutes. The resin, with continued sparging, was allowed to cool to 230° C. over a period of 15 minutes, then the product was poured into a container. The material had a melting point of 78.5° C. and an acid number of 155. Further characteristics follow.

The resinous materials obtained by the above cited examples show definitely improved properties when compared with those of the prior art. They are substantially completely resistant to oxidation, and show practically no tendency to crystallize either when used alone or in a composition in conjunction with other materials. The final product is substantially free from odor and taste imparting substances. Hence, it may be advantageously used in chewing gums, adhesives, metallic resinates, brewer's pitches, etc., where these characteristics are at a premium.

It will be understood that when the percentage of saturation of a hydrogenated rosin is referred to in the specification and claims attached, it is based on a rosin composed entirely of abietic acid having 2 double bonds per molecule. When, however, the percentage saturation of any other natural resin is referred to, it is based on the saturation as measured by the absorption of hydrogen by the natural resin when the most effective catalyst is used, i. e., platinum oxide, for a prolonged period.

It will be understood that the details and examples hereinbefore set forth are illustrative only and that the invention as broadly described and claimed is in no way limited thereby.

What I claim and desire to protect by Letters Patent is:

1. The method for improving hydrogenated rosin, having a hydrogen saturation of between about 25% and 100% of the double bonds, which includes the steps of subjecting said material to the processes of heat treatment at a temperature within the range of from about 200° C. to about 375° C. for a period of from about ¼ hour to about 48 hours and distillation, said distillation being sufficient to remove the light oils and volatile resin decomposition products and insufficient to remove more than about 25% by weight of the product.

2. The method for improving hydrogenated rosin which includes the steps of subjecting a rosin, which has been saturated with hydrogen to the extent of from about 25% to 100%, to the processes of heat treatment at a temperature within the range of from about 250° C. to about 350° C. for a period of from about ½ hour to about 10 hours and distillation, said distillation being sufficient to remove the light oils and volatile resin decomposition products and insufficient to remove more than about 25% by weight of the product.

3. The method for improving hydrogenated rosin which includes the steps of subjecting a rosin, which has been saturated with hydrogen to the extent of from about 50% to about 90%, to the processes of heat treatment at a temperature within the range of from about 250° C. to about 350° C. for a period of from about ½ hour to about 10 hours and distillation, said distillation being sufficient to remove the light oils and volatile resin decomposition products and insufficient to remove more than about 5% to about 15% by weight of the product by sparging with a gas which is inert to the reaction mixture.

4. As a new composition a heat-treated hydrogenated natural resin comprising the residue obtained by distillation of a hydrogenated natural resin, containing abietic acid, saturated to the extent of between 25% and 100% of the double bonds and subsequently heat-treated at a temperature within the range of from about 200° C. to about 375° C., the said distillation being sufficient to remove the light oils and volatile resin decomposition products and insufficient to remove more than about 25% by weight of the product, said resin being characterized by having a lower melting point than that of said original hydrogenated natural resin.

5. As a new composition a heat-treated hydrogenated natural resin comprising the residue obtained by distillation of a hydrogenated natural resin obtained from the Pinaceae tree family, saturated to the extent of between 25% and 100% of the double bonds and subsequently heat-treated at a temperature within the range of from about 200° C. to about 375° C., the said distillation being sufficient to remove the light oils and volatile resin decomposition products and insufficient to remove more than about 25% by weight of the product, said resin being characterized by having a lower melting point than that of said original hydrogenated natural resin.

6. As a new composition a heat-treated hydrogenated natural resin comprising the residue obtained by distillation of a hydrogenated rosin saturated to the extent of between 25% and 100% of the double bonds and subsequently heat-treated at a temperature within the range of from about 200° C. to about 375° C. for a period of from about ¼ hour to about 48 hours, the said distillation being sufficient to remove the light oils and volatile resin decomposition products and insufficient to remove more than about 25% by weight of the product, said resin being characterized by having a lower melting point than that of the original hydrogenated rosin.

7. As a new composition a heat-treated hydrogenated natural resin comprising the residue obtained by distillation of a hydrogenated rosin saturated to the extent of between 25% and 100% of the double bonds and subsequently heat-treated at a temperature within the range of from about 250° C. to about 350° C. for a period of from about ½ hour to about 10 hours, the said distillation being sufficient to remove the light oils and volatile resin decomposition products and insufficient to remove more than about 25% by weight of the product, said resin being characterized by having a lower melting point than that of the original hydrogenated rosin.

8. As a new composition a heat-treated hydrogenated natural resin comprising the residue obtained by distillation of a hydrogenated rosin saturated to the extent of between 50% and 90% of the double bonds and subsequently heat-treated at a temperature within the range of from about 250° C. to about 350° C. for a period of from about ½ hour to about 10 hours, the said distillation being sufficient to remove the light oils and volatile resin decomposition products and insufficient to remove more than about 25% by weight of the product, said resin being characterized by having a lower melting point than that of the original hydrogenated rosin.

9. As a new composition a heat-treated hydrogenated natural resin comprising the residue obtained by distillation of a hydrogenated rosin saturated to the extent of between 50% and 90% of the double bonds and subsequently heat-treated at a temperature within the range of from about 250° C. to about 350° C. for a period of from about ½ hour to about 10 hours, the said distillation being sufficient to remove the light oils and volatile resin decomposition products and insufficient to remove more than about 5% to about 15% by weight of the product, said resin being characterized by having a lower melting point than that of the original hydrogenated rosin.

10. As a new composition a heat-treated hydrogenated natural resin comprising the residue obtained by distillation of a hydrogenated rosin saturated to the extent of between 50% and 90% of the double bonds and subsequently heat-treated at a temperature within the range of from about 250° C. to about 350° C. for a period of from about ½ hour to about 10 hours, the said distillation being sufficient to remove the light oils and volatile resin decomposition products and insufficient to remove more than about 5% to about 15% by weight of the product, by spraying with a gas which is inert to the reaction mixture, said resin being characterized by having a lower melting point than that of said original hydrogenated rosin.

JACOB M. SCHANTZ.